(12) United States Patent
Bezem et al.

(10) Patent No.: US 10,201,220 B2
(45) Date of Patent: Feb. 12, 2019

(54) BACK-CARRYABLE SHOOTING KIT AND METHOD OF USE THEREOF

(71) Applicants: Shlomo Bezem, Modi'in (IL); Vladimir Grexhanik, Beer Sheva (IL)

(72) Inventors: Shlomo Bezem, Modi'in (IL); Vladimir Grexhanik, Beer Sheva (IL)

(*) Notice: Subject to any disclaimer, the term of this patent is extended or adjusted under 35 U.S.C. 154(b) by 0 days.

(21) Appl. No.: 15/480,714

(22) Filed: Apr. 6, 2017

(65) Prior Publication Data

US 2018/0289135 A1    Oct. 11, 2018

(51) Int. Cl.
| | |
|---|---|
| *A45F 4/02* | (2006.01) |
| *A45F 3/04* | (2006.01) |
| *F16M 11/24* | (2006.01) |
| *A47B 3/10* | (2006.01) |
| *A47B 3/12* | (2006.01) |
| *F41A 23/12* | (2006.01) |
| *F41C 33/00* | (2006.01) |

(52) U.S. Cl.
CPC .................. *A45F 4/02* (2013.01); *A45F 3/04* (2013.01); *A47B 3/10* (2013.01); *A47B 3/12* (2013.01); *F16M 11/242* (2013.01); *F41A 23/12* (2013.01); *F41C 33/005* (2013.01)

(58) Field of Classification Search
CPC ...... A45F 3/06; A45F 3/10; A45F 3/12; A45F 4/00; A45F 4/02; A45F 4/04; A45F 4/08; A45F 4/10; A45F 4/14; A45F 2004/003; A45F 2004/006; A45F 2004/023; A45F 2004/026; F41A 23/02; F41A 23/12; F41A 23/14; A01M 31/02; A01M 31/025; A47B 3/10; A47B 3/12; F41C 33/005

USPC ....... 224/575, 577, 153–156, 583, 270, 633; 42/94, 106; 89/37.04, 40.06
See application file for complete search history.

(56) References Cited

U.S. PATENT DOCUMENTS

| | | | | |
|---|---|---|---|---|
| 2,163,759 A | * | 6/1939 | McCann .................. | A47C 7/64 248/95 |
| 3,225,656 A | * | 12/1965 | Flaherty .................. | F41A 23/06 42/94 |
| 4,558,532 A | * | 12/1985 | Wright .................... | F41A 23/16 42/94 |
| 5,271,175 A | * | 12/1993 | West, III ................. | F41A 23/02 297/170 |
| 5,810,301 A | * | 9/1998 | McGrath ................ | A47B 17/02 108/152 |
| 5,884,966 A | * | 3/1999 | Hill ........................ | A47B 83/02 297/170 |
| 6,895,709 B1 | * | 5/2005 | Krien ..................... | A47B 83/02 42/94 |
| 7,152,358 B1 | * | 12/2006 | Leanna ................... | F41A 23/02 42/94 |
| 2003/0140543 A1 | * | 7/2003 | Yeargin .................. | F41A 23/10 42/94 |
| 2007/0145092 A1 | * | 6/2007 | Eberle ..................... | A45F 3/04 224/650 |

(Continued)

*Primary Examiner* — Scott T McNurlen
(74) *Attorney, Agent, or Firm* — Sughrue Mion, PLLC (57) ABSTRACT

A back-carryable shooting kit including a generally planar shooting table surface defining element adapted for attachment thereof to shoulder straps, shoulder straps removably attachable to the generally planar shooting table surface defining element and a tripod support assembly, removably and rotatably connectable to the generally planar shooting table surface defining element for support thereof.

11 Claims, 8 Drawing Sheets

(56) References Cited

U.S. PATENT DOCUMENTS

2009/0282722 A1\* 11/2009 Hoffmann ........... A01M 31/025
  43/1
2015/0076182 A1\* 3/2015 Coleman .................. A45F 3/04
  224/155
2016/0054091 A1\* 2/2016 Bricko .................... F41A 23/16
  42/94

\* cited by examiner

Fig. 2B

BACK-CARRYABLE SHOOTING KIT AND METHOD OF USE THEREOF

FIELD OF THE INVENTION

The present invention relates generally to shooting equipment and assemblies.

BACKGROUND OF THE INVENTION

Various types of shooting equipment and assemblies are known.

SUMMARY OF THE INVENTION

The present invention seeks to provide improved shooting equipment and assemblies.

There is thus provided in accordance with a preferred embodiment of the present invention a back-carryable shooting kit including a generally planar shooting table surface defining element adapted for attachment thereof to shoulder straps, shoulder straps removably attachable to the generally planar shooting table surface defining element and a tripod support assembly, removably and rotatably connectable to the generally planar shooting table surface defining element for support thereof.

Preferably, the generally planar shooting table surface defining element defines a removable rifle mount.

Additionally or alternatively, the generally planar shooting table surface defining element also defines a removable mount for the tripod support assembly.

Additionally or alternatively, the back-carryable shooting kit also includes a blind curtain mounting assembly, which is removably mounted on the generally planar shooting table surface defining element.

In accordance with a preferred embodiment of the present invention, the back-carryable shooting kit may also include a rifle biped support element, which is removably mounted on the generally planar shooting table surface defining element. Additionally or alternatively, the back-carryable shooting kit also includes a pair of arm support pads, which are removably mounted on the generally planar shooting table surface defining element.

Additionally or alternatively, the back-carryable shooting kit also includes a plurality of pouches, which are removably mounted on sides of the generally planar shooting table surface defining element. Preferably the plurality of pouches has at least two different sizes.

There is also provided in accordance with another preferred embodiment of the present invention a method for constructing a shooter's table including the steps of providing a back-carryable shooting kit which includes a generally planar shooting table surface defining element and a tripod support assembly, unpacking the back-carryable shooting kit, removing the tripod support assembly and the generally planar shooting table surface defining element from the back-carryable shooting kit, assembling the tripod support then assembling the generally planar shooting table surface defining element on the tripod support.

Preferably, the method for constructing a shooter's table includes removing a removable mount from said back-carryable shooting kit during unpacking and attaching the removable mount both to said tripod support and to said planar shooting table surface defining element, causing them to be rotatably joined together.

In accordance with a preferred embodiment of the invention, the tripod assembly may be assembled in a position suitable for sitting alongside the generally planar shooting table surface. Alternatively, the tripod assembly may be assembled in a position suitable for standing alongside the generally planar shooting table surface.

Preferably, the method for constructing a shooter's table also includes removing a removable rifle mount from said back-carryable shooting kit and affixing the removable rifle mount to the generally planar shooting table surface defining element. Additionally, a rifle may be packed in the back-carryable shooting kit, removed when unpacking the back-carryable shooting kit and placed on the removable rifle mount affixed on the generally planar shooting table surface defining element. Alternatively, a rifle may be carried separately and not packed in the back-carryable shooting kit and then placed on the removable rifle mount affixed on the generally planar shooting table surface defining element after the generally planar shooting table surface defining element is mounted on the tripod support.

In accordance with a preferred embodiment of the invention, a blind curtain mounting assembly is included and packed in the back-carryable shooting kit, then removed and affixed to the generally planar shooting table surface defining element to create a hunter's blind, once generally planar shooting table surface defining element is mounted on the tripod support.

Preferably, a pair of arm support pads is included and packed in the back-carryable shooting kit, then removed and affixed to the generally planar shooting table surface defining element to provide support for a shooter.

BRIEF DESCRIPTION OF THE DRAWINGS

The present invention will be understood and appreciated more fully from the following detailed description, taken in conjunction with the drawings in which.

DETAILED DESCRIPTION OF A PREFERRED EMBODIMENT

Reference is now made to FIGS. 1A-2C, which illustrate a back-carryable shooting kit 100 constructed and operative in accordance with a preferred embodiment of the present invention. As seen in FIGS. 1A-2C, back-carryable shooting kit 100 is carryable by a user as a backpack and includes a generally planar shooting table surface defining element 102 adapted for attachment thereof to shoulder straps 104, which are preferably removably attachable to the generally planar shooting table surface defining element 102 via attachment apertures 106 (seen in FIGS. 2B & 2C).

Figure 1A:
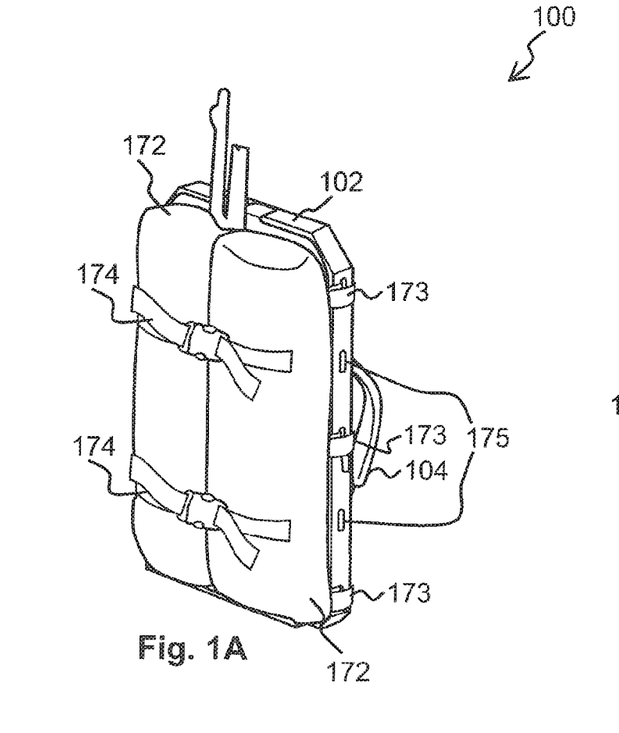
FIGS. 1A and 1B are simplified pictorial illustrations of a back-carryable shooting kit constructed and operative in accordance with a preferred embodiment of the present invention in a back-mounted operative orientation in respective front and back views.
Figure 1B:
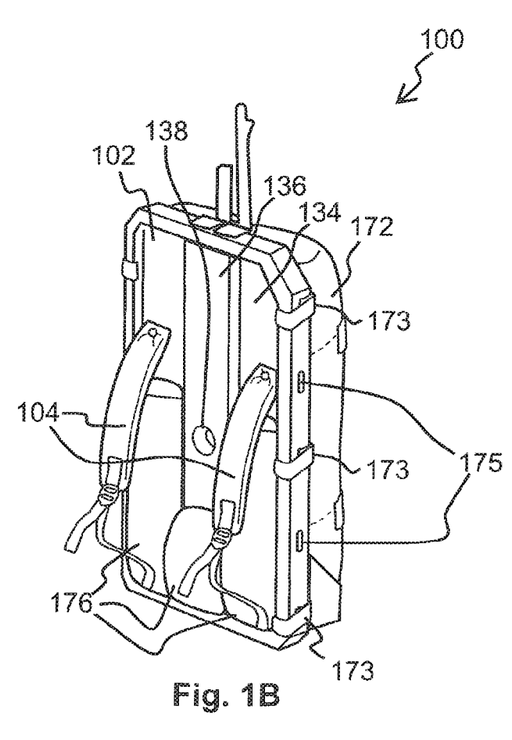
Figure 2A:
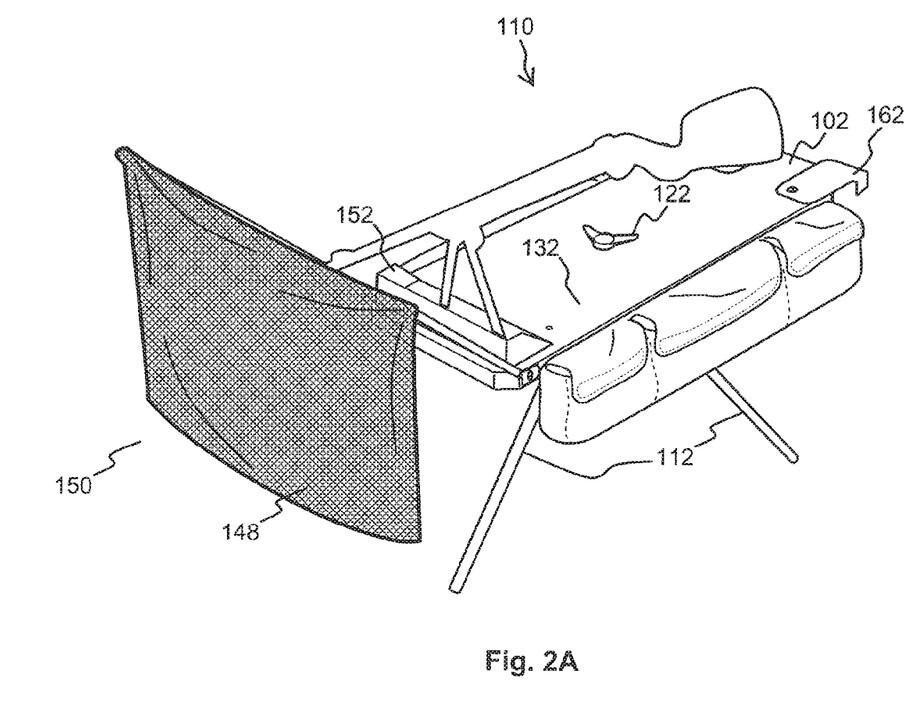
FIGS. 2A & 2B are simplified pictorial illustrations of the back-carryable shooting kit of FIGS. 1A-4D in a shooting operative orientation, respectively with and without a rifle.
Figure 2B:
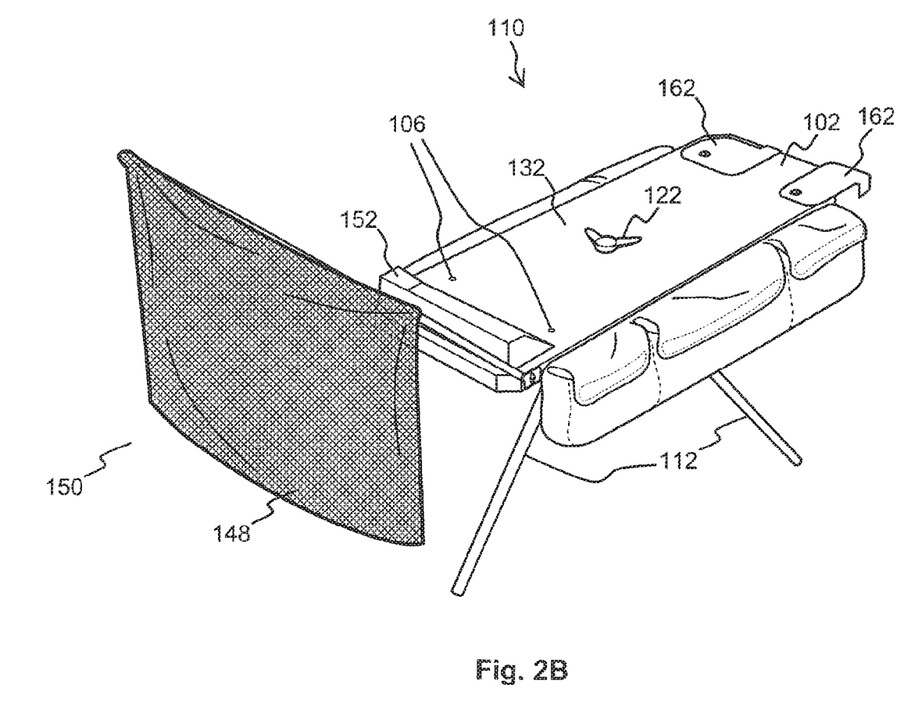
Figure 2C:
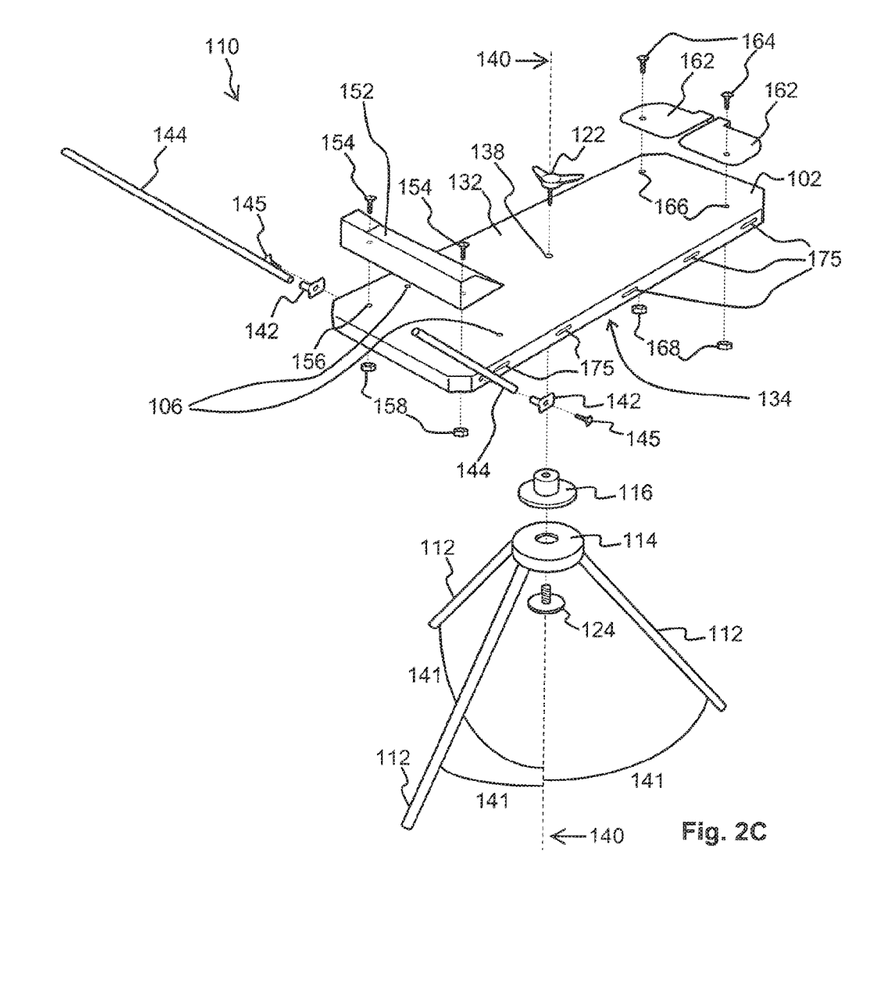
FIG. 2C is a simplified exploded view illustration of parts of the back-carryable shooting kit of FIGS. 1A-4D.

A tripod support assembly 110, preferably including three leg elements 112, an adjustable leg mounting base 114 and a rotatable bearing mount 116, is removably and rotatably connectable to the generally planar shooting table surface defining element 102 for support thereof, preferably by means of mutually threadable top and bottom connectors 122 and 124. Generally planar shooting table surface defining element 102 preferably comprises a generally flat table surface 132 and an opposite surface 134, which defines a tripod mounting surface 136 (seen in FIG. 1B), having an aperture 138 for accommodating at least one of mutually threadable top and bottom connectors 122 and 124. Generally flat table surface 132 also preferably defines a removable rifle mount for use when the kit is being carried as seen in FIGS. 1A & 1B. It is noted that adjustable leg mounting base 114 can attain a plurality of positions upon construction of tripod support assembly 110. The preferably three leg elements 112 are preferably mutually azimuthally spaced upon attachment to adjustable leg mounting base 114 but can be mounted at a variety of angles with respect to axis 140, which is at a right angle from tripod mounting surface 136. Because the preferably three leg elements 112 are preferably mutually azimuthally spaced, each leg preferably makes the same angle 141 with respect to axis 140.

Removably attachable to generally planar shooting table surface defining element 102 by means of brackets 142 are a pair of blind curtain supporting arms 144, which are typically mounted by screws 145 engaging corresponding apertures 146 in planar shooting table surface defining element 102 and which, together with a blind curtain 148, define a blind curtain assembly 150. A rifle bipod support element 152 is removably mounted on the generally planar shooting table surface defining element 102 preferably by means of screws 154 which traverse apertures 156 in planar shooting table surface defining element 102 and which are engaged by nuts 158. It is noted that when back-carryable shooting kit 100 is in a carryable configuration, rifle bipod support element 152 is at bottom of back-carryable shooting kit 100 and is thus useful in providing support for the stock of a rifle, preventing rifle from sliding out of back-carryable shooting kit 100 and thus serving as a removable rifle mount (as seen below in FIGS. 3B-3D). A pair of arm support pads 162 are removably mounted on the generally planar shooting table surface defining element 102, preferably by means of screws 164 which traverse apertures 166 in planar shooting table surface defining element 102 and which are engaged by nuts 168.

The various screws, nuts connectors and blind curtain supporting arms, as well as other equipment, may be conveniently stored in a plurality of pouches 172, which are removably mounted on sides of the generally planar shooting table surface defining element 102 by a plurality of straps 173, preferably three on each side, and can be folded over (as seen below in FIGS. 3A-4D) and secured by a pair of fastenable straps 174 thus enclosing and securing front side of back-carryable shooting kit 100, with or without a rifle (shown but not part of back-carryable shooting kit 100). Said plurality of straps 173 are attached to the generally planar shooting table surface defining element 102 through a plurality of apertures 175 located on either side of generally planar shooting table surface defining element 102. A plurality of smaller pouches 176, attached to back of back-carryable shooting kit 100, are also intended for equipment storage.

Reference is now made to FIGS. 3A, 3B, 3C & 3D, which are simplified front view pictorial illustrations of the back-carryable shooting kit of FIGS. 1A-2B in four different unpacking stages. As seen particularly in FIG. 3A, back-carryable shooting kit 100 is in a fully carryable configuration. The plurality of pouches 172 enclose a rifle which is secured between the plurality of pouches 172 and the generally planar shooting table surface defining element 102 by the fastenable straps 174, in their fastened state. It is also seen that said plurality of pouches 172 are secured to the generally planar shooting table surface defining element 102, as mentioned above in reference to FIGS. 1A-2C, by a plurality of straps 173.

Figures 3A, 3B, 3C, 3D:
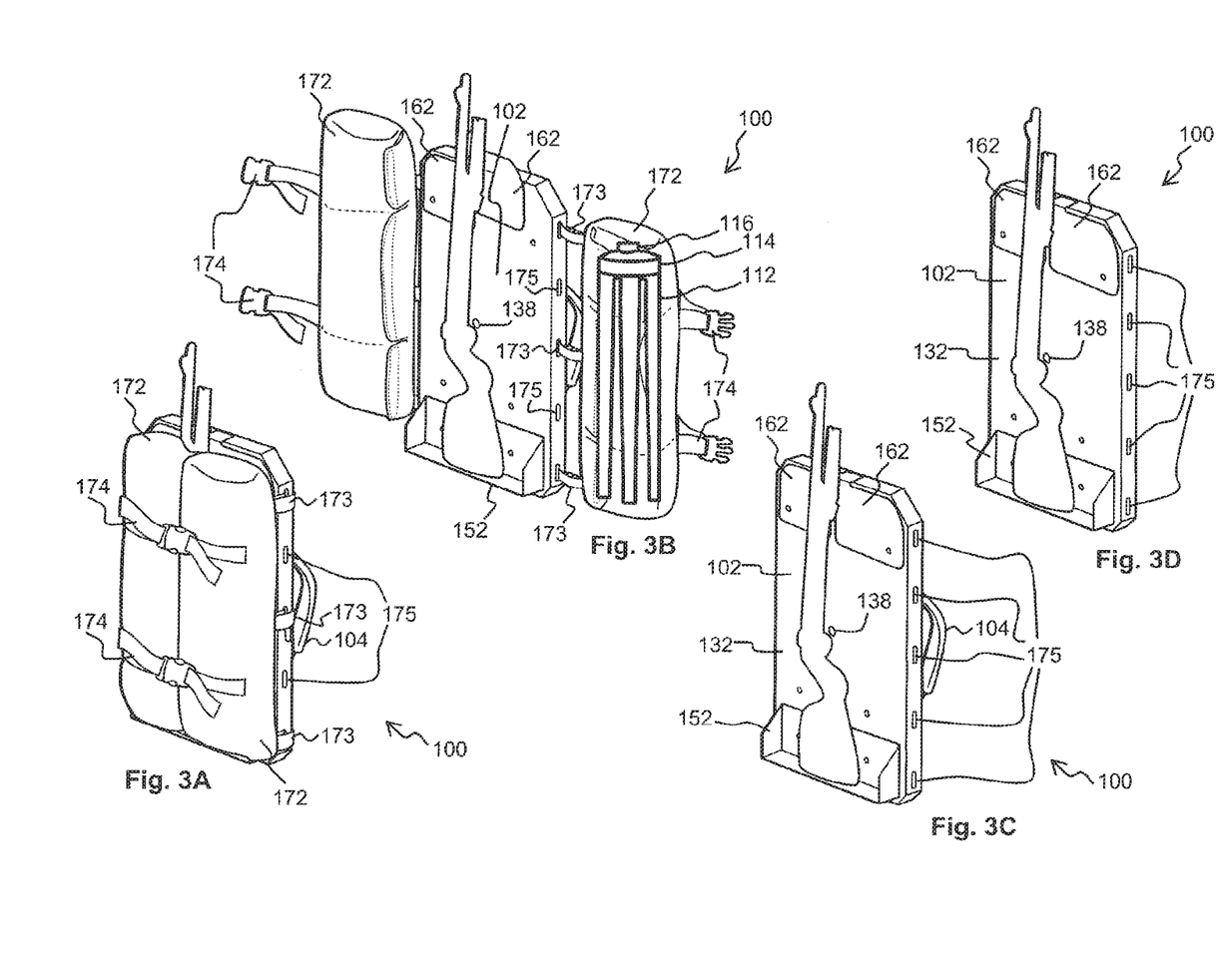
FIGS. 3A, 3B, 3C & 3D are simplified front view pictorial illustrations of the back-carryable shooting kit of FIGS. 1A-2B in four different unpacking stages.

As seen in FIGS. 3B-3D, the back-carryable shooting kit 100 is easily disassembled from a fully carryable configuration. As seen particularly in FIG. 3B, which illustrates the first unpacking stage, the fastenable straps 174 are unfastened and the plurality of pouches 172 are turned aside along the plurality of straps 173. Turning now to FIG. 3C, which illustrates the second unpacking stage, it is seen that the plurality of pouches 172 are removed by detaching the plurality of straps 173 from the plurality of apertures 175 on either side of the generally planar shooting table surface defining element 102. FIG. 3D illustrates the third and last stage of unpacking; in it, the shoulder straps 104 have been detached from the generally planar shooting table surface defining element 102.

Reference is now made to FIGS. 4A, 4B, 4C & 4D, which are simplified back view pictorial illustrations of the back-carryable shooting kit of FIGS. 1A-2B in four different unpacking stages, and correspond to the four unpacking stages as illustrated in FIGS. 3A, 3B, 3C & 3D. As seen particularly in FIG. 4A, back-carryable shooting kit 100 is in a fully carryable configuration. The plurality of pouches 172 enclose a rifle which is secured between the plurality of pouches 172 and the generally planar shooting table surface defining element 102 by the fastenable straps 174, in their fastened state (not visible). It is also seen that said plurality of pouches 172 are secured to the generally planar shooting table surface defining element 102, as mentioned above in reference to FIGS. 1A-2C, by a plurality of straps 173.

Figures 4A, 4B, 4C, 4D:
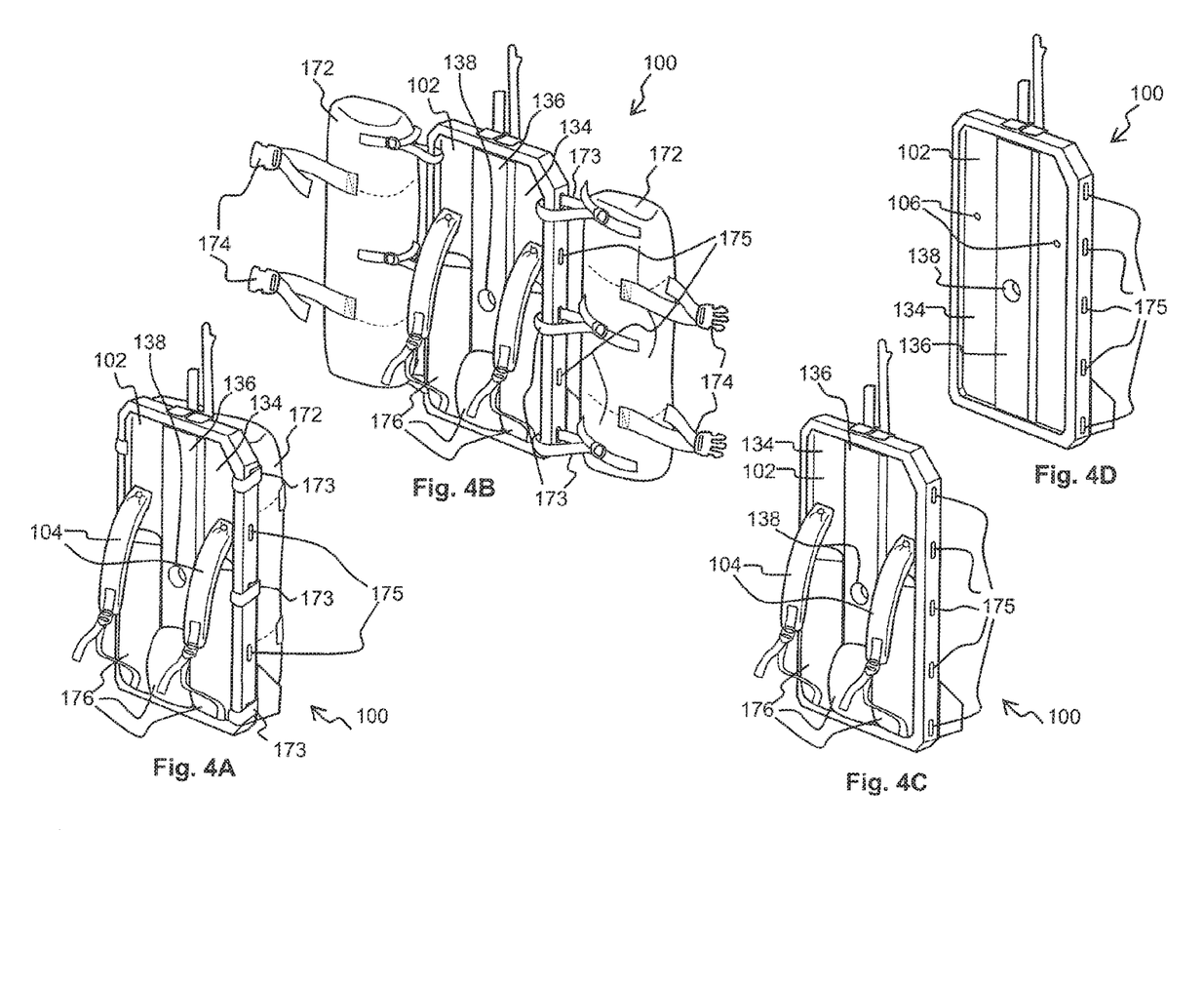
FIGS. 4A, 4B, 4C & 4D are simplified back view pictorial illustrations of the back-carryable shooting kit of FIGS. 1A-2B in four different unpacking stages corresponding to the stages shown in FIGS. 3A-3D.

As seen in FIGS. 4B-4D, the back-carryable shooting kit 100 is easily disassembled from a fully carryable configuration. As seen particularly in FIG. 4B, which illustrates the first unpacking stage, the fastenable straps 174 are unfastened and the plurality of pouches 172 are turned aside along the plurality of straps 173. Turning now to FIG. 4C, which illustrates the second unpacking stage, it is seen that the plurality of pouches 172 are removed by detaching the plurality of straps 173 from the generally planar shooting table surface defining element 102, FIG. 4D illustrates the third and last stage of unpacking; in it, the shoulder straps 104 have been detached from the generally planar shooting table surface defining element 102.

Figure 5A:
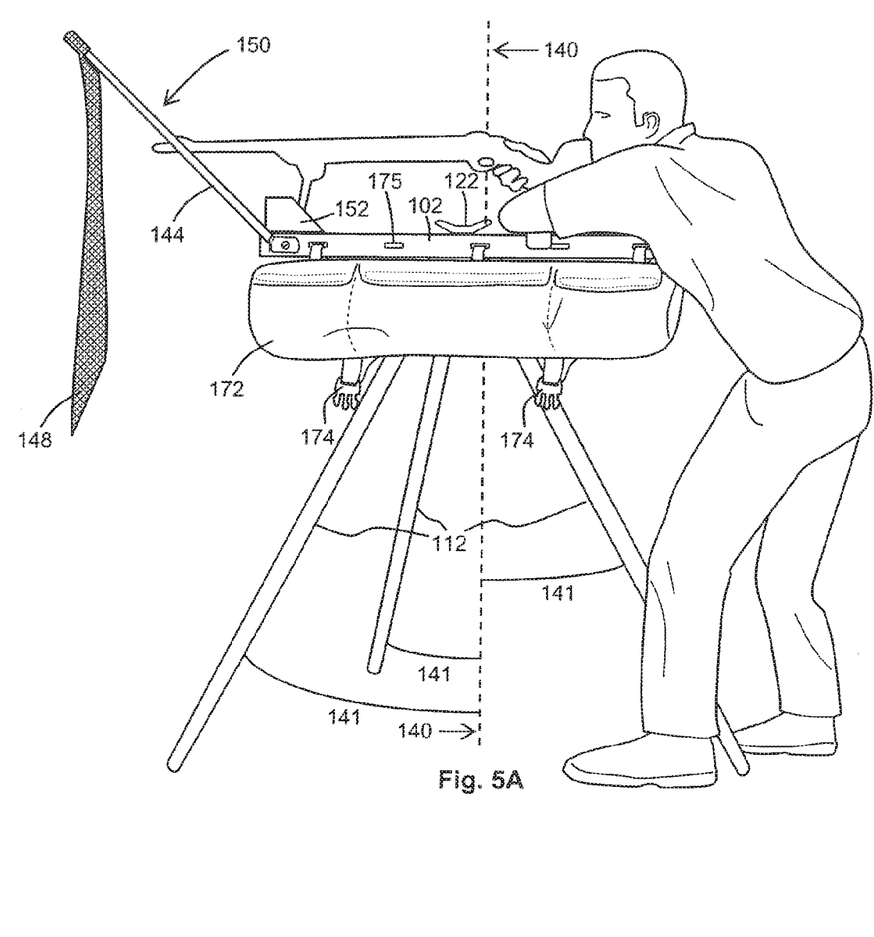
FIGS. 5A and 5B are simplified pictorial illustrations of the back-carryable shooting kit of FIGS. 1A & 1B in respective standing and sitting shooting operative orientations.
Figure 5B:
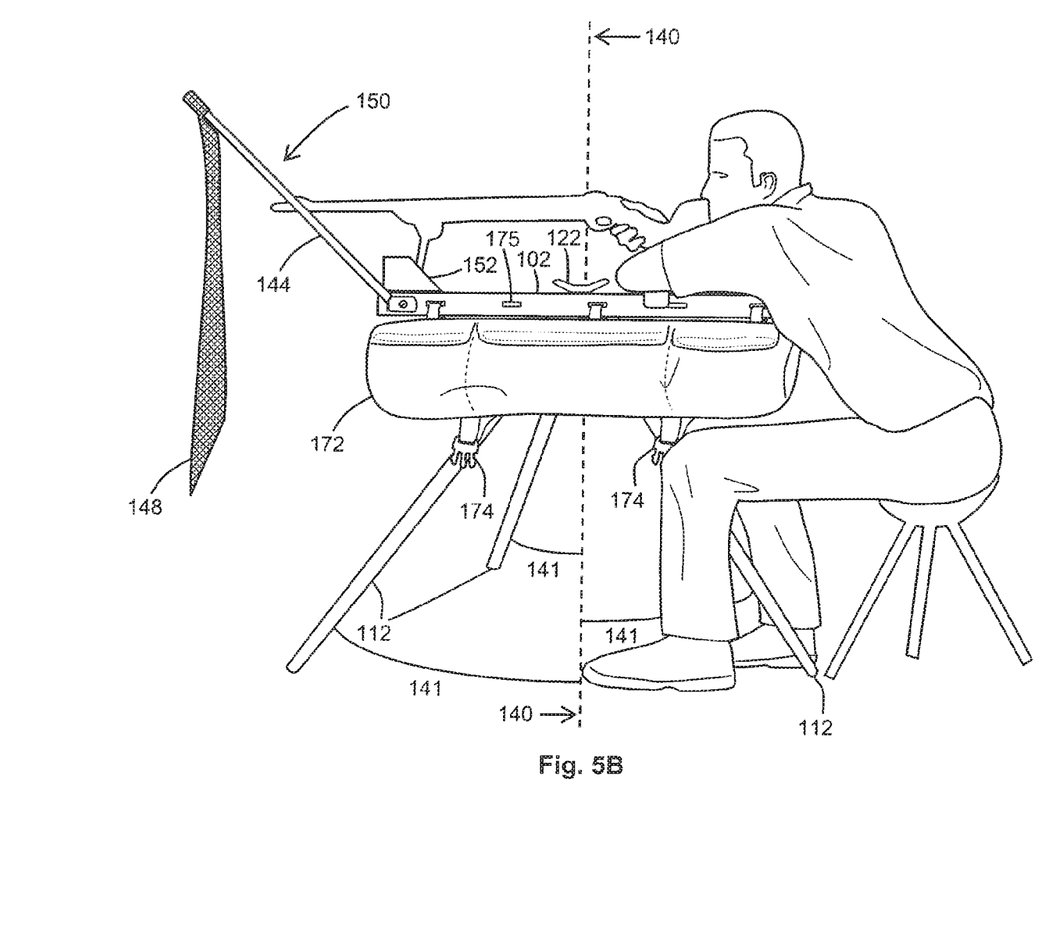

Reference is now made to FIGS. 5A & 5B, which are simplified pictorial illustrations of the back-carryable shooting kit of FIGS. 1A & 1B in respective standing and sitting shooting operative orientations. As seen particularly in FIG. 5A, the tripod support assembly 110 has been erected with a relatively narrow angle 141 with respect to the axis 140, suitable for a standing position for a hunter (refer to FIG. 2C). In this configuration, the preferably three leg elements 112 are grouped relatively close together thus raising the generally planar shooting table surface defining element 102 to a height appropriate for a standing hunter. As seen particularly in FIG. 5B, the tripod support assembly 110 has been erected with a relatively wide angle 141 with respect to the axis 140, suitable for a sitting position for a hunter (refer to FIG. 2C). In this configuration, the preferably three leg elements 112 are grouped relatively far apart thus lowering the generally planar shooting table surface defining element 102 to a height appropriate for a sitting hunter. It is understood that these angles will vary according to the height and comfort level of the individual hunter.

It will be appreciated by persons skilled in the art that the present invention is not limited by what has been particularly shown and described herein. Rather the scope of the present invention includes both combinations and sub-combinations of the various features described hereinabove as well as modifications and variations which would occur to persons skilled in the art upon reading the foregoing description and which are not in the prior art.

The invention claimed is:

1. A back-carryable shooting kit, having at least a carryable configuration and a shooting orientation, the shooting kit comprising:
   a shooting table surface defining element adapted for attachment thereof to shoulder straps;
   shoulder straps removably attachable to said shooting table surface defining element;
   a tripod support assembly, removably and rotatably connectable to said shooting table surface defining element for support thereof;
   a dual purpose rifle bipod support element attached to said shooting table surface defining element, said dual purpose rifle bipod support element being operative, when said back-carryable shooting kit is in said carryable configuration, to be located at a bottom of said back-carryable shooting kit and to provide support for the stock of a rifle; and
   a pair of arm support pads, which are removably mounted on said shooting table surface defining element, at least one of said arm support pads extending beyond a periphery of said shooting table surface defining element; and
   a plurality of pouches, which are removably mounted on sides of said shooting table surface defining element and which, when said back-carryable shooting kit is in said carryable configuration, are configured to enclose a rifle, said rifle being secured between said plurality of pouches and said shooting table surface defining element.

2. A back-carryable shooting kit according to claim 1 and wherein said shooting table surface defining element also defines a removable mount for said tripod support assembly.

3. A back-carryable shooting kit according to claim 1 and also comprising a blind curtain mounting assembly, which is removably mounted on said shooting table surface defining element.

4. A back-carryable shooting kit according to claim 1 wherein said plurality of pouches comprises at least two different sizes of pouches.

5. A method for constructing a shooter's table comprising the steps of:
   providing a back-carryable shooting kit comprising at least a shooting table surface defining element, a tripod support assembly, a dual purpose rifle bipod support element, a plurality of pouches removably mounted on said shooting table surface defining element by a plurality of straps and a blind curtain mounting assembly including a blind curtain;
   unpacking said back-carryable shooting kit, said unpacking comprising:
      removing said tripod support assembly from said back-carryable shooting kit;
      removing said plurality of pouches by detaching said straps from said shooting table surface defining element; and
      removing said blind curtain mounting assembly;
   assembling said tripod support assembly;
   assembling said shooting table surface defining element on said tripod support assembly; and
   affixing said blind curtain mounting assembly to said shooting table surface defining element such that said blind curtain lies entirely forward of a rifle placed on said dual purpose rifle bipod support element.

6. A method for constructing a shooter's table according to claim 5 and wherein:
   said unpacking said back-carryable shooting kit also comprises removing a removable mount from said back-carryable shooting kit; and
   said assembling of said shooting table surface defining element on said tripod support assembly also comprises attaching said removable mount both to said tripod support assembly and to said shooting table surface defining element, causing them to be rotatably joined together.

7. A method for constructing a shooter's table according to claim 5 and wherein said assembling of said tripod support assembly also comprises assembling said tripod support assembly in a position suitable for sitting alongside said shooting table surface defining element.

8. A method for constructing a shooter's table according to claim 5 and wherein said assembling of said tripod support assembly also comprises assembling said tripod support assembly in a position suitable for standing alongside said shooting table surface defining element.

9. A method for constructing a shooter's table according to claim 5 and wherein:
   said back-carryable shooting kit also comprises said rifle; and
   said unpacking of said back-carryable shooting kit also comprises removing said rifle from said back-carryable shooting kit; and
   said assembling of the shooting table support assembly on said tripod surface also comprises placing said rifle on said rifle bipod support element.

10. A method for constructing a shooter's table according to claim 5 and wherein:
    said assembling said shooting table surface defining element on said tripod support assembly also comprises placing said rifle, carried separately and not previously packed in said back-carryable shooting kit, on said rifle bipod support element.

11. A method for constructing a shooter's table comprising the steps of:
    providing a back-carryable shooting kit comprising at least a shooting table surface defining element, a tripod support assembly, a dual purpose rifle bipod support element, a plurality of pouches removably mounted on said shooting table surface defining element by a plurality of straps and a pair of arm support pads;
    unpacking said back-carryable shooting kit, said unpacking comprising:
       removing said tripod support assembly from said back-carryable shooting kit; and
       removing said plurality of pouches by detaching said straps from said shooting table surface defining element;
       removing said pair of arm support pads;

assembling said tripod support assembly; and
assembling said shooting table surface defining element on said tripod support assembly; and
affixing said pair of arm support pads to said shooting table surface defining element to provide support for a shooter.

\* \* \* \* \*